United States Patent [19]
Devlin

[11] 3,709,447
[45] Jan. 9, 1973

[54] MODULAR SATELLITE

[76] Inventor: William A. Devlin, 1720 Canal Court, Merritt Island, Brevard County, Fla. 32952

[22] Filed: July 29, 1970

[21] Appl. No.: 59,089

[52] U.S. Cl. .................................. 244/1 SS, 178/6.8
[51] Int. Cl. ............................................. F16d 63/00
[58] Field of Search ..244/1 R, 1 SA, 1 SS, 1 A, 1 SC; 340/179, 180, 6.8, DIG. 1, DIG. 20, DIG. 21, DIG. 28; 343/225

[56] References Cited

UNITED STATES PATENTS

| | | | |
|---|---|---|---|
| 3,548,211 | 12/1970 | Gardner | 244/1 SS |
| 3,488,439 | 1/1970 | Laird | 178/6.8 |
| 2,910,683 | 10/1959 | Todd | 340/189 |

*Primary Examiner*—Richard E. Aegerter
*Attorney*—Duckworth & Hobby

[57] ABSTRACT

A satellite apparatus is provided whereby a plurality of experiments may be monitored in a single satellite for a plurality of different organizations. The satellite has modular casings for placement on a frame and adapted to place experimental components therein with instrumentation facing a centrally located scanner which transmits data on the experiments to a receiving station.

6 Claims, 4 Drawing Figures

PATENTED JAN 9 1973

William A. Devlin
INVENTOR

By Duckworth & Hobby
Attorney

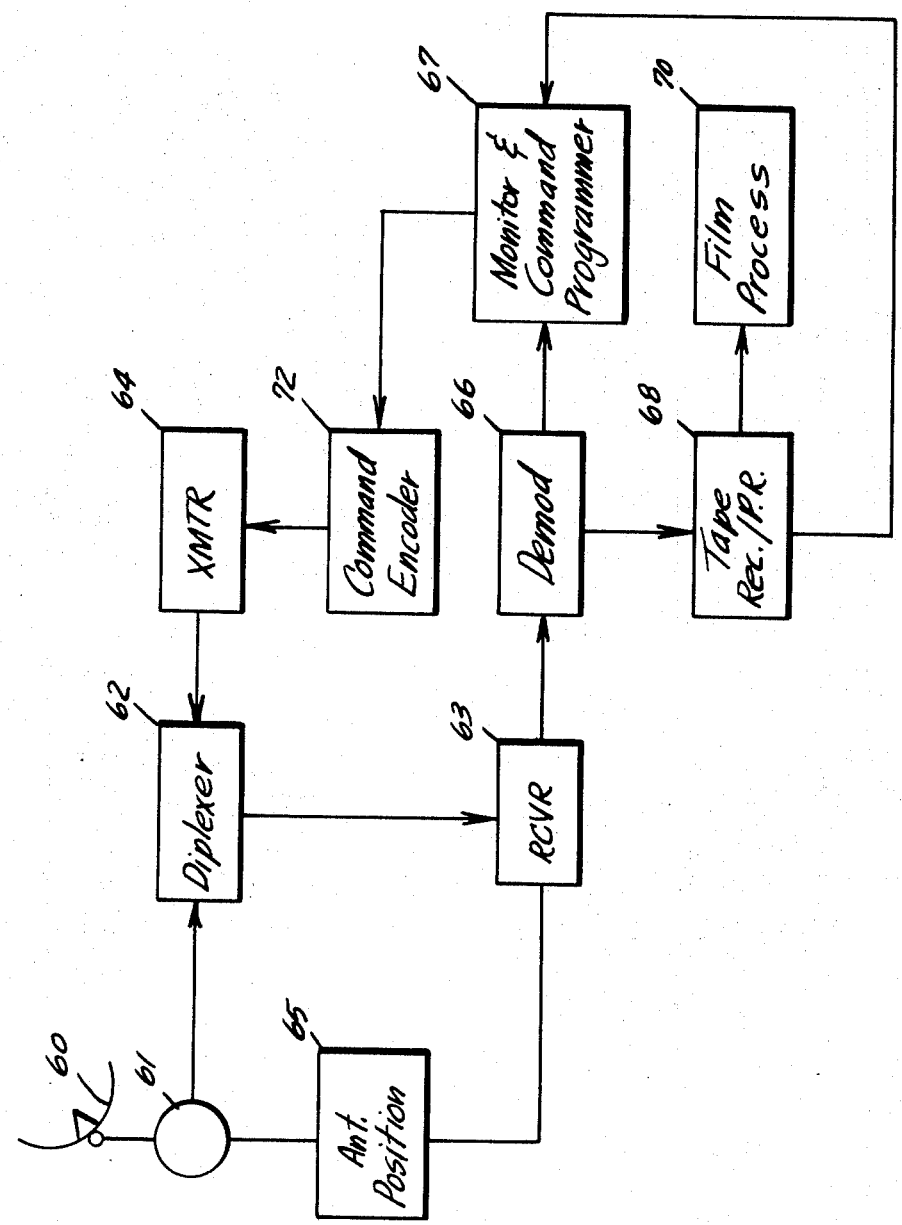

MODULAR SATELLITE

BACKGROUND OF THE INVENTION

The present invention relates to satellites and especially to modular satellites for the rapid inclusion of different experimental modules in a single satellite utilizing a single scanning and transmitting electronics for reading and transmitting the results of experiments.

In the past various types of satellites have been used for recording date in an actual space environment. The prior art satellites have been primarily used by governmental agencies because of the great cost of the satellite, the rocket for placing the satellite in orbit and telemetric materials required. Because of this great cost, especially in the rocket for placing satellites in orbit, it has been suggested to place a plurality of satellites upon one rocket and orbiting each of the satellites in space from a single rocket launching. This has worked satisfactorily in some cases but increases the complexity of the operation by requiring that the satellites be separated from the rocket and each other once in space. The costs as well as the limited availability of rocket vehicles for placing satellites in orbit, has limited independent and non-governmental organizations from participating in research involving a space environment and from obtaining useful information for the advancement of science and for use in the design of advanced space vehicles.

Accordingly, it is one object of the present invention to provide a modular satellite system in which a large number of organizations can participate in a more economical manner in space research by the utilization of a single data module for the reading and transmitting of data for each of the experiments to be performed by utilizing a standard frame and modular casings rather than a typical prior art means of designing each satellite from scratch. Thus, each experiment is designed to fit in a modular casing which is readily attached to the frame of the modular satellite.

SUMMARY OF THE INVENTION

The present invention relates to satellites and especially to modular satellites having a satellite frame with a data module centrally located on the frame, in which the data module has a scanning lens or mirror for scanning a series of experiments and optically focusing the instrument panels of the experiments onto a camera tube. A plurality of experiment modules are attached to the frame surrounding the data modules and each experimental module has a modular casing for accepting components for each experiment and attachment to the frame to form an integral part of the satellite. Each experiment has an instrument panel facing the scanning means. The data module has a transmitter connected with the camera for transmitting the signals of the scanned experiment modules to a ground receiving station. A main power source, such as may be provided by solar batteries, is provided to produce the electrical power necessary for operation of the data module while each of the plurality of experiment modules may have separate power sources such as solar batteries, connected to the periphery of the satellite and may receive additional power from the main bank of solar batteries. One end of the satellite may be transparent to provide the light for illuminating the experiment modules during scanning and a light source such as low voltage fluorescent type lighting may be provided for additional illumination.

It is also contemplated that electronics can be provided for separating the signals from each scanned experiment so that an organization can receive only the continuous record of its experimental module.

BRIEF DESCRIPTION OF THE DRAWINGS

Other objects, features and advantages of this invention will be apparent from a study of the written description and the drawings in which:

FIG. 4 shows one embodiment of ground electronics that may be used with the present invention.

DESCRIPTION OF THE PREFERRED EMBODIMENT

Figure 1:
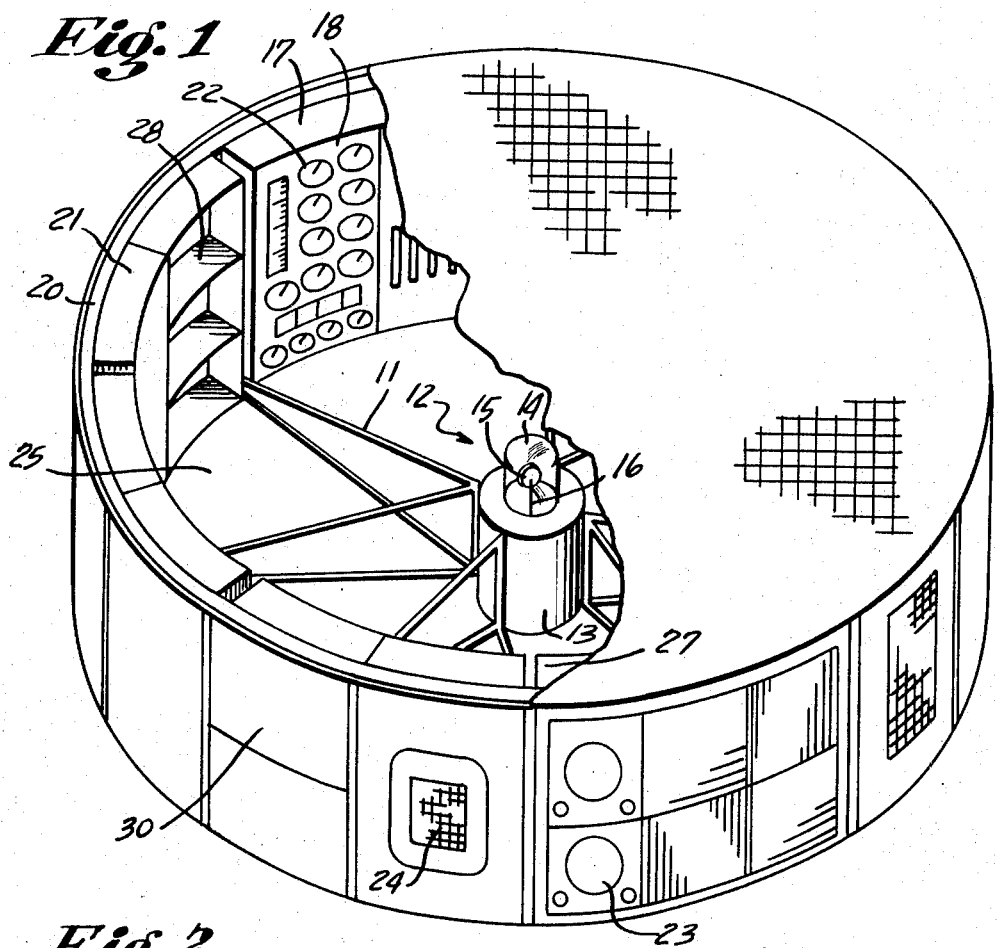
FIG. 1 shows a perspective view with parts broken away of a modular satellite in accordance with the present invention.

Turning now to FIG. 1, the modular satellite 10 of the present invention is shown in perspective, having a frame 11 which may be made of solid or tubular rods such as steel or aluminum or any other material as desired. The frame 11 has a data module 12 located in the center thereof and having a casing 13 and a periscope 14. Transparent periscope 14 can be seen having a mirror, mirrored prism or fiber optics 15 therein attached to a holding rod 16 whereby the mirror may be rotated for directing intermittently the image of the experiment module 17 instrumental panel 18 into the data module 12. The experimental modules 17 are fixedly attached to the periphery of frame 20 and having a casing 21 for placing the experimental module components into prior to attaching the case 21 to the frame 20. Thus, standardized module compartments or cases 21 may be supplied to organizations desiring to run space environment experiments for installation of the components of the experiment in the standard case and having optical read-out instruments 22 facing the inside of the compartment 21. These modules may then be attached to the frame 21 along with modules prepared by other organizations or groups. The outside of the compartment 21 may have special surfaces 23 for taking desirable readings such as meteorite bombardment, solar radiation readings, or the like, which measurements will be reflected in the instrumentation 22 which will be in turn viewed by the reflector 15 reflecting the instrument panels into the data module 12 where the signal is processed and transmitted to a ground station, as will be described in more detail. It is anticipated that each experimental module 17 will have its own power source such as solar batteries 24, or long life batteries contained within the experimental module, such as mercury batteries, or the like. The bottom portion 25 of the satellits 10 is coated with solar batteries facing the opposite side of the present perspective view for generating electrical power to operate the data module 12. This power can also be used for additional power for an individual experimental module 17, if this becomes necessary. The opposite side and top of the satellite 10 has a transparent surface 26 for allowing the transmission of light therethrough to produce the necessary illumination to illuminate the instrumentation 22 of the experimental modules 17 for reflecting into the reflector 15 for producing the necessary signals on a camera tube such as an image Orthicon tube located in a data module 12 casing 13. Since it may also be desirable to run experiments when there is not sufficient illumination, low power requirement fluorescent or similar lights 27 are provided in the satellite and are connected onto the main source power system 25 for illuminating the dials when the light passing through the transparent screen 26 is inadequate.

Casing 21 of the experimental module 17 may have reenforcing shelves 28 and may have standard breadboards chassis members prefitted for the placement of electronic or other components of the modules so that a module may be rapidly prepared within a standard size module or standard fitted breadboard chassis for insertion into the satellite. This has the advantage of requiring a short lead-time for the preparation of an individual experiment for the addition to a planned orbiting of a satellite since the satellite does not have to be designed from scratch and the transmission and reception electronics are built-in, as well as modular cases for attachment directly to a prepared satellite. The only requirement is that the electronics for experiments be made to fit in standard modules but which may be expanded into more than one module or may be split for two experiments in a single module area as shown at 30. The casing can be sealed and environmentally controlled if desired. An optical read-out is anticipated for the satellite but it will of course be clear that the necessary electrical conductors can pass through one of the tubes 11 into the data module 12 to have an auxiliary signal fed directly into the transmission system without departing from the scope of the present invention. It is also anticipated that the reflector 15 will rotate either continuously or intermittently so that a series of signals transmitting the read-out for the experimental modules will read from one to the next continuously and will have to be split into separate experiments at the ground station, so that each organization will only see those signals of its experiments. However, the reflector 15 could be stopped facing one experiment and could have the lens controlled by command for getting a better view of one particular experiment by stop command and a zoom command to operate a zoom lens.

Figure 2:
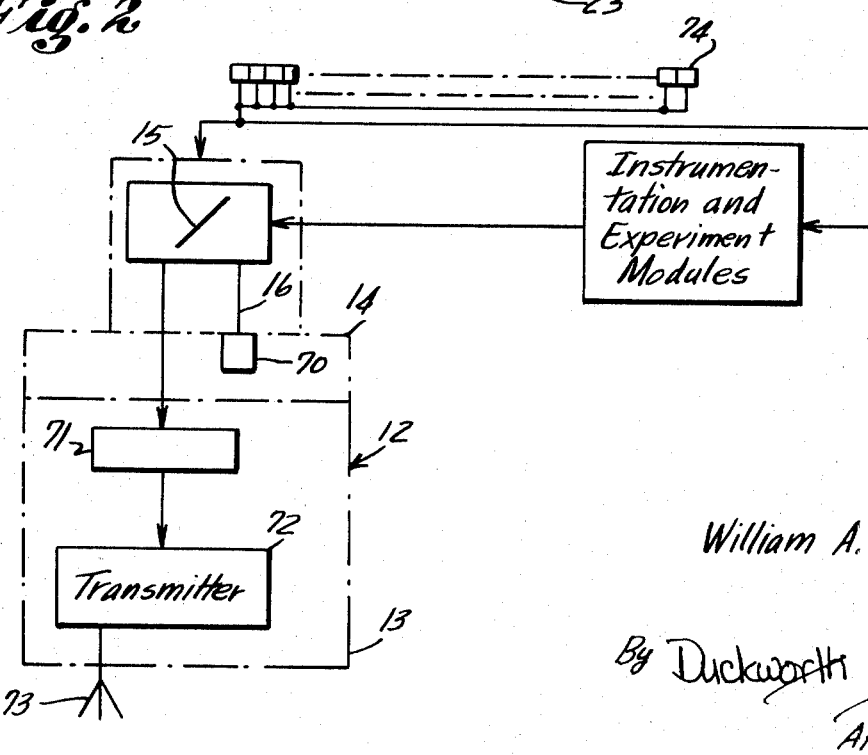
FIG. 2 is a diagramatic illustration of the operation of the satellite of FIG. 1.

Referring now to FIG. 2, a simplified block diagram of the operation of the satellite of FIG. 1 is illustrated in which the data module 12 is illustrated having a lower casing 13 and transparent periscope 14. The rotating reflector element 15 is seen being attached to a shaft or arm 16 from a motor 70 which may be a stepping or a selsyn type motor for rotating scanner 15 on command from the command logic through the operational mode relays. This reflector element may also be provided with means for tilting to different angles, for instance such as by mounting motor 70 on a tiltable mount which can be tilted with relays operating solenoids, or the like. The signal being received from the instrumentation experimental modules 17 is reflected toward the TV camera tube located in a TV camera 71, which signal is converted to an electrical signal and applied to the transmitter 72 and hence to the antenna 73 for transmission to the ground station. The batteries are shown located on one end of a generally drum-shaped satellite for providing power to the data modules 12 for operation of the electronics. A line is also shown leading to the instrumentation in experimental module 17 where excess power may be needed from the main solar battery bank.

Figure 3:
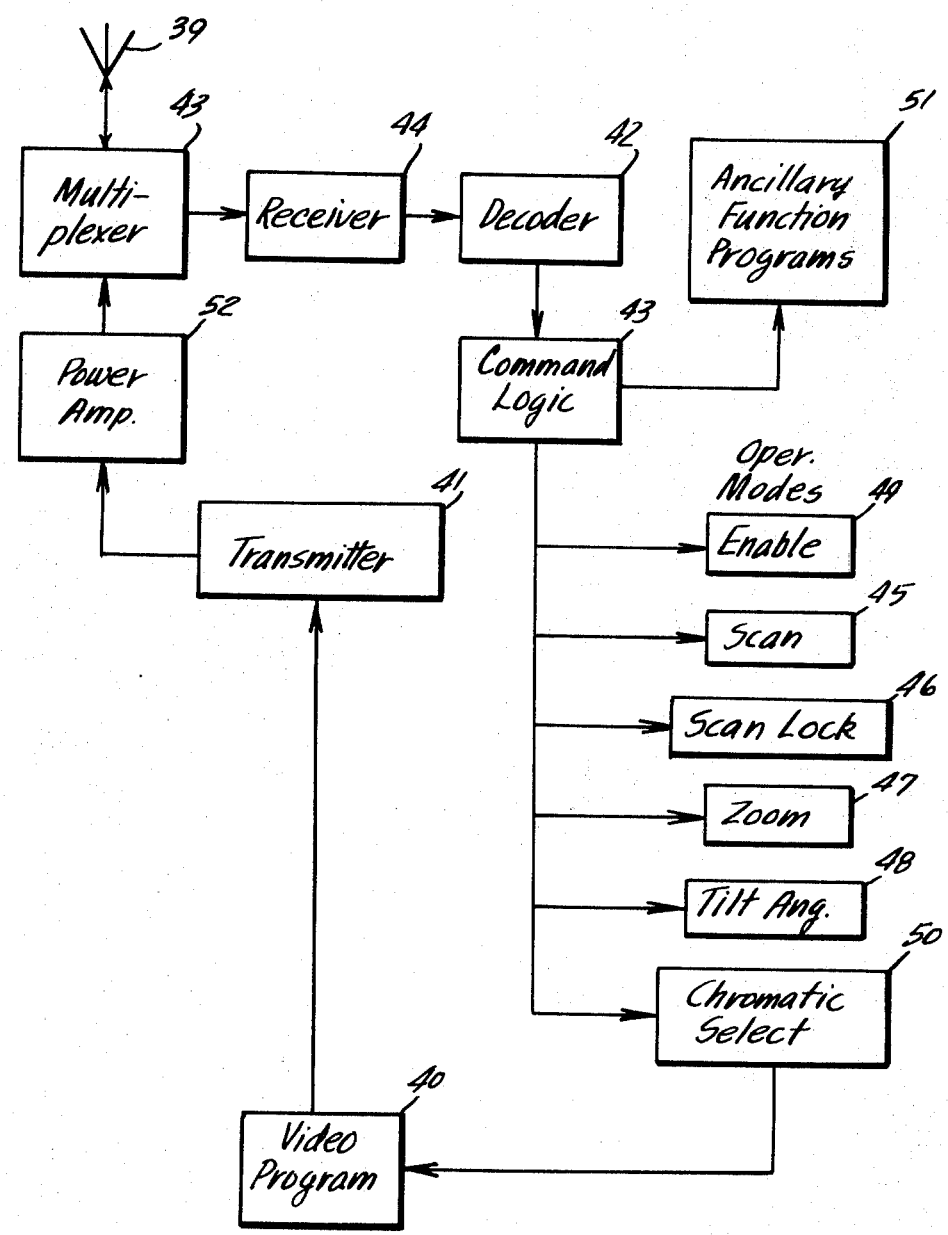
FIG. 3 shows a block diagram of one embodiment of the electronics for use in the data module of the present invention.

Referring now to FIG. 3, there is shown a block diagram of electronics that could be used on board the satellite of FIG. 1 primarily in the data module 12 of FIG. 1. In the typical system in accordance with the present invention, the reflecting prism 15 reflects the optical signals into the data module 12, casing 13 and onto a camera tube such as an image Orthicon tube which converts this light picture into a sequence of electrical signals necessary for transmission. These signals may be treated such as by amplification of the video program being fed past the video program switch 40 which turns on the transmitter 41 for transmitting video signals via the power amplifier 45 through the multiplex switch 52 to apply the signal to the antenna 39. The blocks of the diagram are commercially available equipment and items like the transmitter circuit 41 would normally include the modulator for modulating the picture signals on the radio frequency carrier as well as a wide bank video amplifier and an RF amplifier. The incoming signals from the ground station for producing commands in the satellite are received at the antenna 39 and are switched by the multiplexer switch 43 into the receiver 44 which receiver can include such items as RF amplifier, first detector for converting the RF signals to the IF signals, and IF amplifiers prior to impinging the signals upon decoder 42 for providing command signals to select the desired operational mode 45 through 49 and 50 or the ancillary function programs 51. The operational modes might typically include the enable mode 49 for turning on the power, scan mode 45 for starting the periscope rotation, scan lock 46 for locking the scan on a particular experimental module, the zoom 47 for zooming the lens in the periscope towards the experimental module, the tilt-angle mode 48 for tilting the mirrors for field of view and the chromatic select mode 50 for selecting colors such as red, ultraviolet, IR sensing, and the like. The ancillary function programs 51 are for the additional operation mode such as microscope reading slides to operate the slides, and the like. The operational modes are primarily relays or other solid state logic matrixes to feed the signals back to the video program switch 40 for transmission to the ground station. The electronics in the satellite compliment include electronics of commonly available circuits even though it is to be understood that it may be desirable in a particular case to design special electronics without departing from the spirit and scope of the present invention.

The data module electronics comprise a typical transceiver unit for receiving commands for operating a motor drive for the periscope reflector and the video circuits for receiving the optical signals converting them to electrical signals and transmitting the signals to a ground station. Typical ground station electronica are illustrated in FIG. 4 which has the ground station antenna 60 with an antenna base 61, which antenna receives the signals from the satellite 10, directs them to the diplexer 62 which is a switch for switching the received signals to the receiver 63 and the transmitted signals from the transmitter 64 to the antenna 60 without interference with each other. The receiver has a feedback for an antenna position 64 for electrically positioning the antenna towards the overpassing satellite and the receiving signal is fed to a demodulator 66 for demodulating the signal and feeding to a monitor 67 for constant monitoring of the incoming signals and also to a tape record playback unit 68 and a film processor 70 where the recorded incoming video signal can be selectively isolated with each experimental module portion of the tape being put on separate tapes or film separate from the remaining signals and so that each organization can have the results of his particular experiment shown in a continuous film or tape strip. The tape recording playback 68 then feeds the tape monitor 67 to the command programmer 71, initiates commands to the command encoder 72 which is in turn connected to the transmitter then to the diplexer and applied to the antenna 60 where it is transmitted to the satellite, initiating commands via the satellite receiver decoder and command logic.

Again, it will be clear that a simple block diagram of typical electronics that could be used from the ground station have been provided. Standard available ground station compliments in existing ground stations can be utilized in the present satellite and the only necessary change being required would be to separate the signals from the different experimental modules, which may be performed manually directly from the tape or films of the received signals or may be done with the proper electrical circuits, if it were desired to have an immediate read-out of the signals for each organization.

It will of course be clear that other power sources other than solar batteries could be used in the present invention, but at the present time these appear to be the most advantageous for long periods of reading results from a space vehicle, keeping in mind, however, that intermediate storage batteries may also be necessary for the solar batteries charge.

At this point it will be clear that a modular type satellite has been provided which is adapted to overcome the problems required in the long lead time for building a satellite from scratch and also to provide the opportunity for economical participation in space environment experiments by a variety of organizations. However, this invention is not to be construed as limited to the particular forms disclosed herein since these are to be regarded as illustrative rather than restrictive.

I claim:

1. A satellite apparatus comprising in combination;
   a. a satellite frame;
   b. a plurality of experiment modules attached to said satellite frame, each said experiment module having a modular case for accepting components for experiments therein with each said case forming an integral part of said satellite when attached to said frame, and each said experiment module having an instrument side thereon;
   c. scanning means for scanning the instrument side of each said experiment module, said scanning means being located so as to be partially surrounded by said experiment modules and being rotatably attached to said satellite for rotation therein;
   d. command means for actuation of said scanning means on predetermined commands;
   e. camera means for receiving optical images from said scanning means and converting said optical images to signals for transmission;
   f. transmission means connected to said camera means for transmitting the signals of said scanned experiment modules generated by said camera means to a ground station receiving means; and
   g. a power source for providing electrical power to said transmission means whereby a plurality of experiments may be transmitted to a receiving ground station.

2. The apparatus in accordance with claim 1 in which said satellite has said experiment modules located around its periphery and has two ends, one end being translucent whereby said instrument side can be illuminated from the passage of light through said translucent end.

3. The apparatus in accordance with claim 2 in which said other end of said satellite has solar type batteries thereon.

4. The apparatus in accordance with claim 3 in which said satellite has lighting means therein for illuminating said instrument side of said experiment modules.

5. The apparatus in accordance with claim 4 in which said scanning means includes a revolving reflector.

6. The apparatus in accordance with claim 5 in which said experiment modules have solar batteries located thereon for powering said modules.

* * * * *